(12) United States Patent
Song et al.

(10) Patent No.: US 8,755,149 B2
(45) Date of Patent: Jun. 17, 2014

(54) SHIELD DESIGNS WITH INTERNAL MAGNETIZATION CONTROL FOR ATE IMPROVEMENT

(75) Inventors: Suping Song, Fremont, CA (US); Lijie Guan, Milpitas, CA (US); Tai Min, San Jose, CA (US); Yuhui Tang, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/620,764

(22) Filed: Sep. 15, 2012

(65) Prior Publication Data
US 2014/0078619 A1 Mar. 20, 2014

(51) Int. Cl.
*G11B 5/127* (2006.01)
(52) U.S. Cl.
USPC .......................................................... 360/125.3
(58) Field of Classification Search
USPC ............... 360/125.3, 125.03, 125.09, 125.04, 360/125.16, 125.12, 125.06, 125.15, 360/125.07, 125.31, 125.71, 125.17, 125.13
See application file for complete search history.

(56) References Cited

U.S. PATENT DOCUMENTS

| 7,263,318 B2 * | 8/2007 | Nishihama et al. ........... 399/267 |
| 7,768,741 B2 | 8/2010 | Feng |
| 7,983,009 B2 | 7/2011 | Ota et al. |
| 8,149,537 B2 * | 4/2012 | Nazarov ..................... 360/125.3 |
| 8,164,852 B2 * | 4/2012 | Lee et al. ................. 360/125.03 |
| 2006/0199043 A1 | 9/2006 | Sugimoto et al. |
| 2007/0274003 A1 | 11/2007 | Ota et al. |
| 2010/0033879 A1 | 2/2010 | Ota et al. |
| 2011/0019309 A1 | 1/2011 | Hsiao et al. |
| 2012/0113544 A1 | 5/2012 | Bonhote et al. |

OTHER PUBLICATIONS

PCT Search Report PCT/US2013/059655 Mailed: Nov. 12, 2013.

* cited by examiner

*Primary Examiner* — Allen T Cao
(74) *Attorney, Agent, or Firm* — Saile Ackerman LLC; Stephen B. Ackerman

(57) ABSTRACT

A magnetic recording head is fabricated with a pole tip shielded laterally on its sides by a pair of symmetrically disposed side shields formed of porous heterogeneous material that contains non-magnetic inclusions. The non-magnetic inclusions, when properly incorporated within the magnetic matrix of the shields, promote the formation of flux loops within the shields that have portions that are parallel to the ABS and do not display locally disorganized and dynamic regions of flux during the creation of magnetic transitions within the recording medium by the magnetic pole. These flux loop portions, combine with the magnetic flux emerging from the main pole to create a net writing field that significantly reduces adjacent track erasures (ATE) and wide area erasures (WATE).

9 Claims, 5 Drawing Sheets

SHIELD DESIGNS WITH INTERNAL MAGNETIZATION CONTROL FOR ATE IMPROVEMENT

BACKGROUND

1. Technical Field

This application relates generally to magnetic recording heads, particularly to the design of magnetic shields that restrict the magnetic write field to tracks being written on and eliminate adjacent track erasures (ATE).

2. Description of the Related Art

The increasing need for high areal recording densities ($\square$750 Gb/in$^2$) is making the perpendicular magnetic recording head (PMR head) a replacement of choice for the longitudinal magnetic recording head (LMR head). By means of fringing magnetic fields that extend between two emerging pole pieces, a main pole (MP) and a return pole, magnetic recording heads form small magnetic domains within the surface plane of the magnetic medium (hard disk). As recorded densities increase, these domains must correspondingly decrease in size, eventually permitting destabilizing thermal effects to become stronger than the magnetic interactions that tend to stabilize the domain formations. This occurrence is the so-called superparamagnetic limit. Recording media that accept perpendicular magnetic recording, allow domain structures to be formed perpendicularly to the disk surface and a soft magnetic underlayer (SUL) formed within the medium acts as a stabilizing influence on these perpendicular domain structures. Thus, a magnetic recording head that produces a field capable of forming domains perpendicular to the disk surface, when used in conjunction with such perpendicular media, is able to produce a stable recording with a much higher area density than is possible using standard longitudinal recording.

A significant problem with magnetic pole structures that are currently used to produce perpendicular fields, is that the fields tend to exhibit significant lateral (cross-track direction) fringing, thereby producing unwanted erasures in tracks adjacent to those actually being written on, called "adjacent track erasure" (ATE). If the erasures extend beyond those tracks adjacent to the track being written on, creating a wide area of erasures, the effect is called "wide area track erasure" (WATE). Moreover, these two effects are exacerbated by high-frequency magnetic fields, which will make them an increasing problem in high data-rate recording. The traditional approach to restricting the extent of the fringing magnetic field to only those areas on which writing is desired, is to surround the emerging tip of the main pole with magnetic shields. These shields are formed of magnetic material and, in various configurations, may surround the pole tip at its top and bottom (in a down-track direction) and/or at its sides (in a cross-track direction).

Two views of a common shielded pole fabrication can be seen by referring to FIGS. 1 and 2. FIG. 1 is a schematic view through the ABS plane of the shielded pole structure as it appears when formed, as part of the PMR head (nominally called the "front" of the head) showing, in cross-section, a substrate (5), the beveled pole tip (10), two opposing side shields (20) laterally disposed about the pole tip and an upper shield (40) formed above the pole. The rear portion of the pole is not seen in this figure, but is seen (as (27)) in the overhead view of FIG. 2.

FIG. 1 also shows a horizontal write gap layer (50) preferably formed of alumina, and, typically, alumina side gap insulating layer (60) surrounding the pole. As can be seen, the facing surfaces (25) of the two side shields are slanted in such a way as to form a truncated wedge-shaped opening, widest at the upper shield surface, within which is formed the beveled pole tip. In this common structure, the side shields are formed of homogeneous magnetic alloys, such as NiFe alloy.

Referring now to FIG. 2, there is shown an overhead cross-sectional view through a horizontal plane of the fabrication of FIG. 1, taken at a level through the central plane of the main pole. Because of the position of the plane through the main pole, the upper shield is not shown. Two separated side shields (20) are seen laterally disposed about the pole tip (10). The main pole flares laterally (26) in a direction away from the ABS. In this typical configuration, the side shields will be formed of a homogeneous magnetic material such as a nickel-iron (NiFe) alloy and, typically, these shields would be plated and then shaped appropriately by a method such as reactive-ion etching (RIE).

Unfortunately, it has been found that side shields formed of a homogeneous plated magnetic alloy, as illustrated in FIG. 2, do not provide sufficient lateral shielding to prevent ATE and WATE when the writer operates at high-frequencies. Although there have been attempts to address the problem, such as taught by:

U.S. Patent Application 2010/0033879 (Ota et al),
U.S. Pat. No. 7,983,009 (Ota et al) and
U.S. Patent Application 2007/0268623 (Feng), These teachings do not provide the advantageous results of the present disclosure, specifically lacking the capability of meeting the objects described in the summary below.

SUMMARY

It is a first object of this application to provide a magnetic shield that can more effectively shield against high frequency magnetic fields.

It is a second object of this application to provide a magnetic writer with side shields that prevent ATE and WATE even at high-frequency rates of writing.

It is a third object of this application to provide such a shielded writer in which the shields are configured geometrically in a manner that does not require significant revision of fabrication methods.

The objects of the present disclosure are realized by the use of a heterogeneous magnetic shielding material that incorporates inclusions of non-magnetic material within a matrix of magnetic material. The use of such heterogeneous material allows the formation of shield geometries, in top, bottom and side shields, that promote magnetic flux closures of a particularly advantageous shape. In the present disclosure, these flux closures and the non-magnetic inclusions that promote them, are designed to channel magnetic flux near the ABS of main pole side shields in directions that are parallel to the ABS plane. The combined magnetic field of the magnetic pole tip and the magnetic shields has a reduced divergence within the region of the magnetic disk being written upon, so that ATE and WATE are significantly reduced.

DETAILED DESCRIPTION

The application describes the use of heterogeneous magnetic shield materials that incorporate non-magnetic materials within a matrix of magnetic materials. Although this material can be used advantageously in forming top and bottom (i.e., leading and trailing) shields for a magnetic writer, the present description will be directed at the use of such materials in the design of side shields that offer a more effective reduction of ATE and WATE, particularly at high frequency writing.

Figure 1:
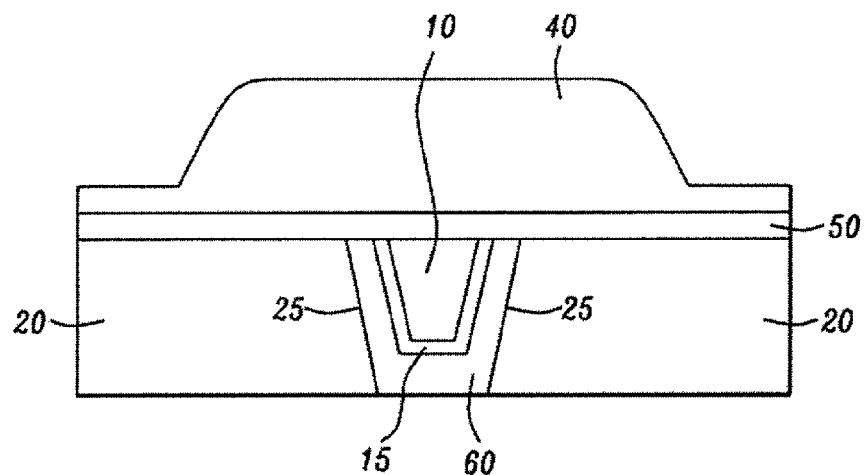
FIG. 1 is a schematic representation of an air bearing surface (ABS) surface cross-sectional view of a typical shielded magnetic pole structure showing top and side shields.
Figure 2:
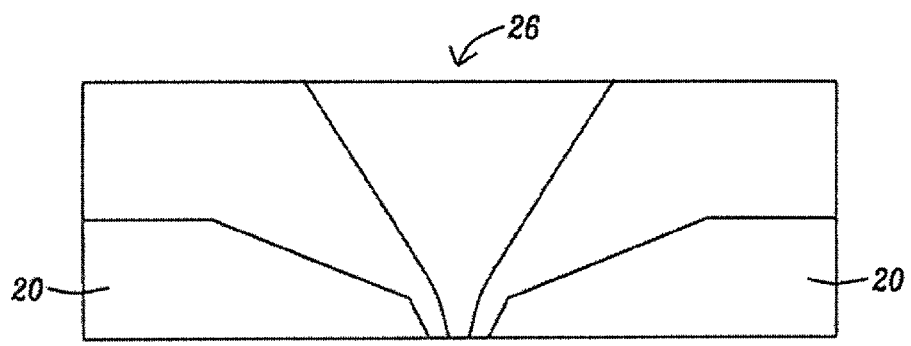
FIG. 2 is a schematic representation of an overhead view, through an intermediate level horizontal cross-sectional plane, of the pole structure in FIG. 1, showing the geometrical alignment of the main pole and its side shields.
Figure 3:
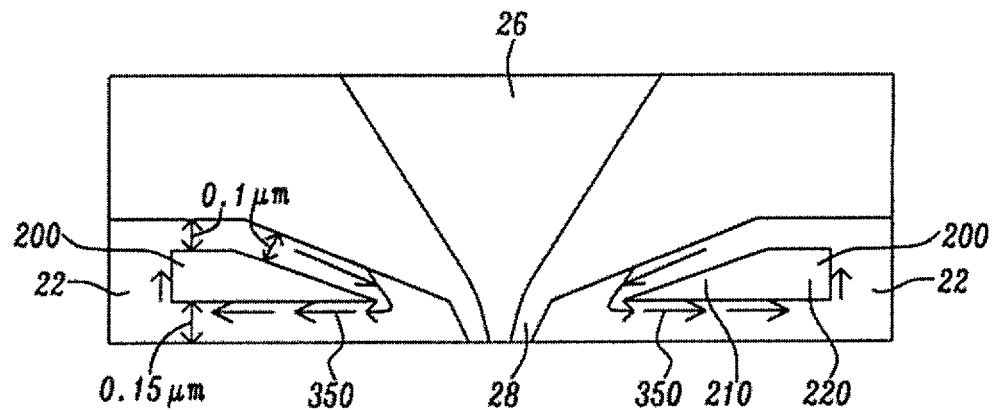
FIG. 3 is a schematic representation of an overhead view, through an intermediate level horizontal cross-sectional plane, of a side-shielded pole structure as in FIG. 1, however where the side shields are now formed of heterogeneous porous magnetic material incorporating non-magnetic inclusions.

Referring now to FIG. 3, there is shown (analogously to the cross-sectional illustration in FIG. 2) an overhead cross-sectional view along a horizontal mid-plane of a fabrication similar to that of FIG. 1, the cross-sectional plane being through the main pole and side shields. Because of the mid-plane position of the cross-section through the main pole, neither an upper nor lower shield is shown. However, unlike the material structure depicted in FIG. 1 and FIG. 2, the side shields in the structure of FIG. 3 are formed of porous, heterogeneous magnetic materials that incorporate non-magnetic inclusions.

The two separated side shields (22) are seen laterally disposed about the beveled pole tip. The main pole flares (expands) laterally to form a broad section (26) in a direction away from the ABS. At the ABS end, the tip is beveled (28) and, in an ABS view, would have an approximately trapezoidal shape as shown, schematically, in FIG. 1.

In this particular side shield configuration of the present disclosure, the side shields have been shaped to fit conformally between the side of the flared portion (26) of the main pole and the ABS of the write head so as to include interior regions (200) of similar perimeter shape as the external perimeter of the shield as a whole. These interior regions (or others having different shapes) will contain non-magnetic material. Dimensions of the side shields are approximately as shown in the figure, namely maximum depth away from the ABS is approximately 0.5 microns (exterior perimeter edge perpendicular to the ABS), separations between the internal perimeters of the inclusions and the external perimeter of the magnetic shield as a whole is approximately 0.1 microns away from the perimeter of the shield distant from the ABS and approximately 0.15 nm from the shield edge that is adjacent to the ABS.

As a result of the external and internal geometry of these side shields, continuous flux loops form and surround the porosities of the non-magnetic regions (200). The geometry of these flux loops create lines of flux (350) that are parallel to the ABS surface of the side shields and restrict the divergence of the net magnetic field that emerges at the writer ABS and writes on the magnetic medium. As can be seen in the figure, the inclusion region (200) is substantially congruent with the general shape of the side shield. In this particular design (which is exemplary), the inclusion region comprises a triangular portion (210) with laterally extending rectangular portions (220). The matrix portion (22) of the shield which surrounds the inclusion region includes a substantially triangular portion with a beveled end that is congruent with the beveled tip of the magnetic pole.

Figure 4A:
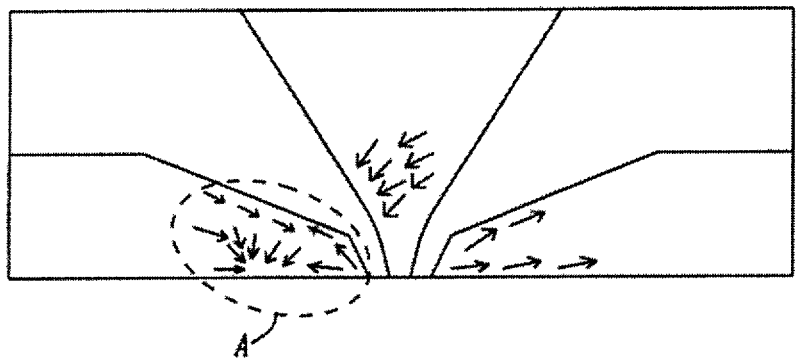
FIGS. 4a and 4b are illustrations of flux lines in a currently used write head with homogeneous shields (4a) and in the heterogeneous porous shield design with non-magnetic inclusions (4b).
Figure 4B:
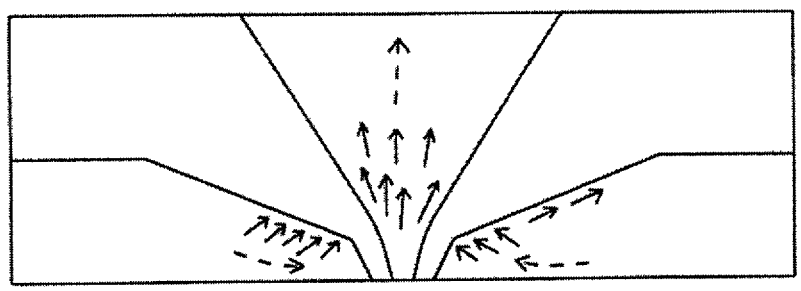

Referring now to FIGS. 4a and 4b, there are shown two schematic, simplified illustrations taken from simulations showing some of the local flux lines (small arrows) in the main pole and side shields of the homogeneous side shields (21) of FIG. 4a and the inhomogeneous, porous side shields (22) of FIG. 4b. Note that FIG. 4b does not show the porous regions, but the schematically drawn flux arrows are a result of those regions being present. Note also that larger, broken line, arrows drawn in FIG. 4b are simply meant to represent the more uniform and orderly progression of local flux arrows. Observation of the figures indicate that the homogeneous side shields (FIG. 4a) produce areas of chaotically oriented, disorganized flux lines (circled, indicated as (A)) that are both irregular and dynamic (changing in time, but time dependence is not shown here). These flux arrows are immediately adjacent to the ABS of the shields, when the main pole is producing magnetic transitions in the magnetic recording medium. Further, these irregular and dynamic flux orientations are largely responsible for erasures on the magnetic medium during magnetic field transitions produced by the main pole. It can also be seen that the irregular orientations also persist along shield edges adjacent to the pole tip and the net result is that the flux lines from the pole tip are somewhat disorganized and irregular.

Referring now to FIG. 4b, there is shown a pole and side shield configuration similar to FIG. 4a except that the side shields are inhomogeneous (porous) and contain inclusions of non-magnetic material (which do not appear in this schematic illustration of a simulation). As can is indicated in this schematic representation of simulation results, there are far fewer local regions of highly disorganized flux lines adjacent to the ABS and, in addition, the flow of flux between the shields and the pole tip is generally more uniform and coherent as indicated by the larger, broken line arrows showing general flux paths as well as by the smaller flux arrows. It is to be noted that these flux configurations associated with heterogeneous shield materials containing non-magnetic inclusions will also exist in leading and trailing shields that are formed above and below the main pole. Thus, there is the capability of reducing the number of regions within a shield where chaotic configurations of flux lines become disorganized and dynamic and can cause erasures along the magnetic recording medium during magnetic transitions of the main pole.

Figure 5:
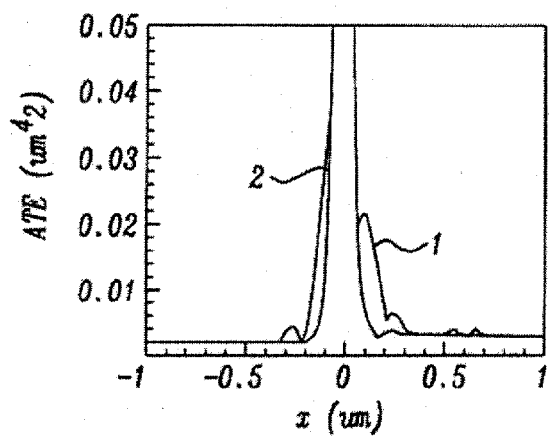
FIG. 5 is a tabular and graphical illustration comparing the on-track and ATE performance of a side shielded writer using typical homogeneous magnetic shields and a similar writer using magnetic shields containing non-magnetic material inclusions.

Referring now to FIG. 5, there is shown Table 1 and a corresponding graph. Table 1 and the graph both compare the on-track performance of a typical side-shielded writer of current design (denoted POR) such as that in FIG. 2 and the side-shielded writer design (porous SS) of this disclosure as shown in FIG. 3. The table displays values of the write-field magnitude (Hv) in Oe, the down-track field gradient (Hgrad) in Oe/nm, the cross-track gradient on the left side of the main pole in Oe/nm (xHgradL), the cross-track gradient on the right side of the main pole in Oe/nm (xHgradR), the write bubble width in nm (EWAC) and, finally, the area of the ATE region in (microns)$^2$, denoted (ATE).

The graph beneath the table plots the performance of the customary homogeneous material design (1) and the heterogeneous shield material design of the present application (2) in terms of ATE to the left and right sides of the main pole in terms of x-distance. The abscissa of the graph is distance x in microns away from the track to either side of the center line. The graph ordinate is the ATE in microns squared at that point on the abscissa. As can be seen, the customary design (1) has a broader distribution to both sides of the center line (x=0) than thy present design.

Figure 6A:
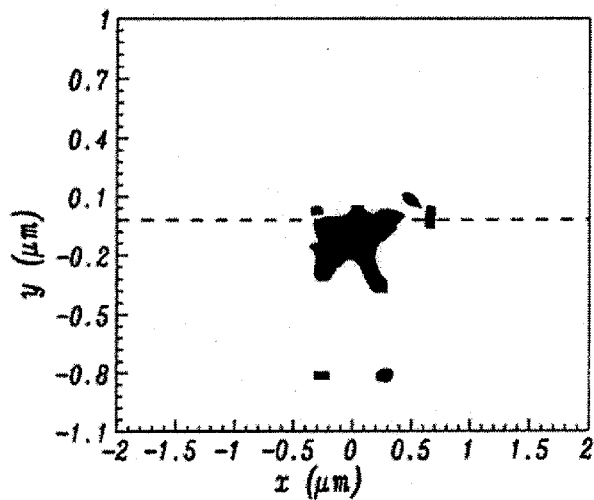
FIGS. 6a and 6b contain two graphical illustrations showing the actual locations of disk erasures produced by the two side shielded writers of FIG. 4 so that an area profile can be determined.
Figure 6B:
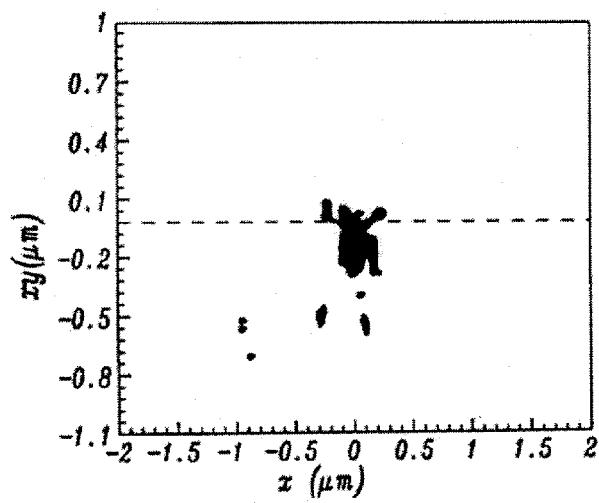

Referring finally to FIG. 6, there are shown two surface (x-y) profiles of scattered measured erasure area locations. Graph (a) shows the profile for POR design of homogeneous shield material and graph (b) shows the profile for the present design with non-magnetic inclusions in a matrix of magnetic shield material. As can be seen, the ATE area surrounding the design of the present disclosure (porous shields) is much smaller than that of the homogeneous shield design.

Figure 7A:
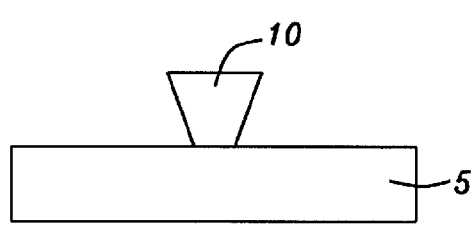
FIGS. 7a,a', 7b,b', 7c,c',c"-7d,d'd" are a sequence of schematic ABS and overhead views showing a process for fabricating a side-shielded write head having heterogeneous side shields.
Figure 7A:
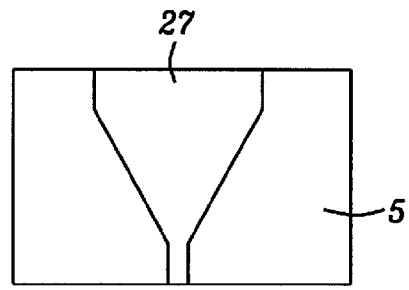

Referring now to FIGS. 7a,a' through 7d,d',d" there will be described, schematically, a sequence of processing steps employed in fabricating a side-shielded write head having the heterogeneous side shields of the present application. The figures each show an ABS view of the fabrication an overhead view of the same fabrication. FIG. 7a shows a substrate (5), which could be a lower shield portion, and the ABS shape of the tip (10) of a main magnetic pole as it appears in the ABS. FIG. 7a' an overhead view of the same fabrication, showing the substrate (5) and the rearward portion of the main pole (27).

Figure 7B:
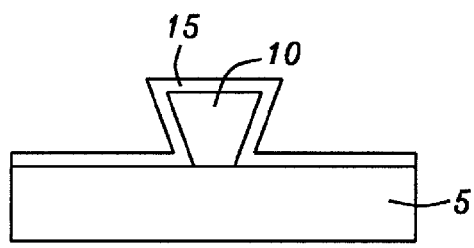
Figure 7B:
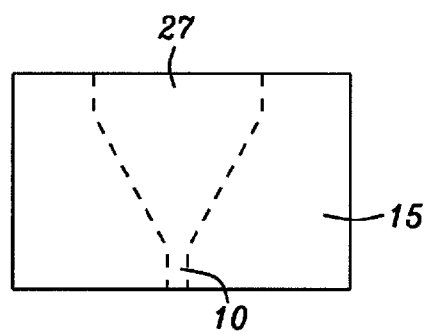

Referring next to FIG. 7b, there is shown schematically the fabrication of FIG. 7a, with the deposition of a side gap layer (15) conformally deposited over the entire pole. The side gap layer is typically a non-magnetic material such as Al$_2$O$_3$ or the like. The illustration of FIG. 7b', there is shown the overhead view with the side gap layer blanketing the rear (27) and tip (10) of the pole (now shown in dashed outline).

Figure 7C:
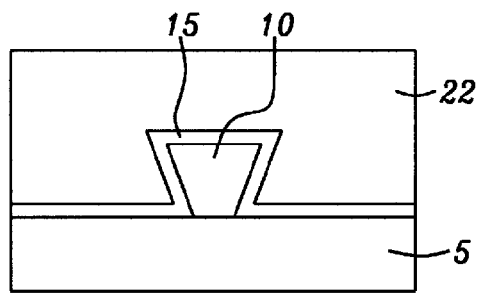
Figure 7C:
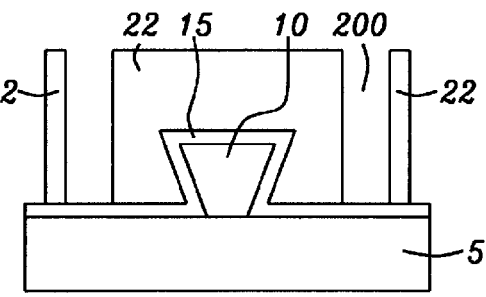
Figure 7C:
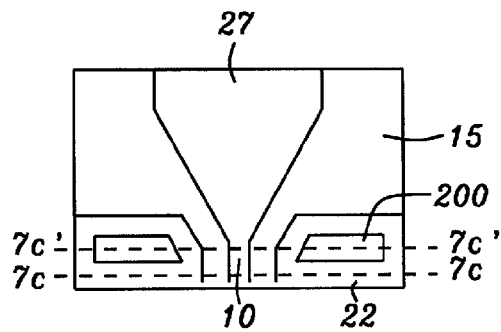

Referring next to FIGS. 7c and 7c', there is shown a forward portion, 7c, and rearward portion, 7c', each representing a view from the ABS direction of a cross-sectional slice of the fabrication taken through parallel planes 7c' and 7c as indicated in FIG. 7c". The cross-sectional planes, 7c and 7c' are shown in FIG. 7c" as horizontal dashed lines. The upper two planes indicated in FIGS. 7c and 7c' represent ABS directional views of the slices through a plated shield (22) with an opening (200) that is visible in the 7c' slice but not visible in the 7c slice. The overhead view in FIG. 7c" also shows the entire shape of the shield, with a solid annular portion (22) surrounding the opening (200), much like a "doughnut." The horizontal dashed lines 7c and 7c' correspond to the two views of FIG. 7c and FIG. 7c'. The doughnut (i.e. annular) shaped shield can be formed by plating the shield material through a plating mask formed of a photoresistive material. The plating mask would be the "negative" version of the final annular shield, in that the mask would have a solid core surrounded by an annular moat. The open moat would then accept the plated shield material and the solid core would leave the opening. Note that the pole (27) and its tip (10) are shown in solid line outline for clarity, although they are still covered by the side gap layer (15).

Figure 7D:
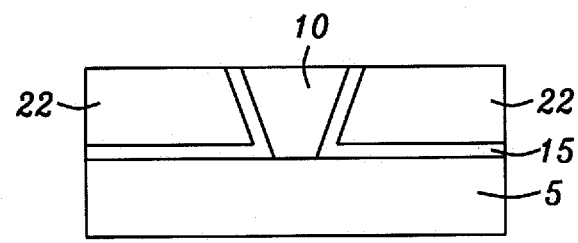
Figure 7D:
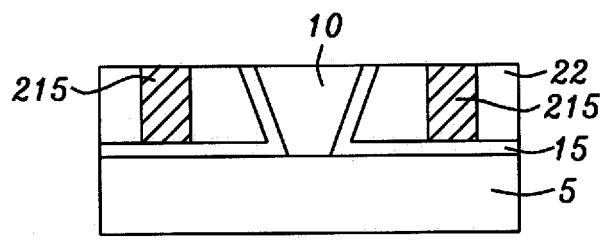
Figure 7D:
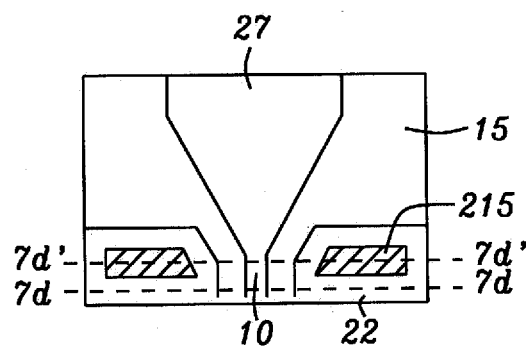

Referring finally to schematic FIG. 7d upper portion and FIG. 7d' lower portion there is shown the fabrications of FIGS. 7c and 7c' respectively, where the previously empty openings in the shields ((200) in FIG. 7c") have now been filled (215) by a non-magnetic deposition, such as Al$_2$O$_3$. The entire fabrication is then planarized to remove excess side shield material and, most likely, the upper portion of the side gap layer as well. Note that the openings need not be filled with a non-magnetic material, they could be left as voids and still produce the heterogeneous side shields desired to meet the objects.

As is understood by a person skilled in the art, the preferred embodiment of the present disclosure is illustrative of the present disclosure rather than limiting of the present disclosure. Revisions and modifications may be made to methods, materials, structures and dimensions employed in forming and providing a side-shielded write-head having heterogeneous side shields formed with the inclusion of non-magnetic material, while still forming and providing such a side-shielded write head and its method of formation in accord with the spirit and scope of the present disclosure as defined by the appended claims.

What is claimed is:

1. A magnetic write head comprising:
    a main pole;
    a pair of side shields formed symmetrically to either side of said main pole, wherein,
    each of said side shields has a surface that is parallel to an ABS of said write head and another surface that is contiguous with said main pole; and wherein
    said side shields are formed of porous heterogeneous material comprising non-magnetic material distributed within a matrix of magnetic material; and
    wherein, when said main pole is magnetized and creating magnetic transitions, said side shields are characterized by magnetic flux loops having a flux component parallel to the ABS plane of the write head that is locally regular and dynamically coherent.

2. The magnetic write head of claim 1 wherein said flux component of said side shields combine with an emerging magnetic flux from said main pole to produce a net flux for writing on a magnetic medium that is restricted in a cross-track dimension about a track center line thereby significantly reducing ATE and WATE.

3. The magnetic write head of claim 1 wherein said side shields are formed of a NiFe alloy enclosing an empty region.

4. The magnetic write head of claim 1 wherein said side shields are formed of a NiFe alloy enclosing an inclusion of alumina.

5. The magnetic write head of claim 1 wherein each of said side shields has a closed external perimeter in a cross-sectional horizontal mid-level plane wherein said external perimeter includes an edge that is contiguous with an edge of a perimeter of said beveled main pole and another edge that is parallel to said ABS of said write head and wherein each of said side shields contains a non-magnetic inclusion having an internal closed perimeter that is congruent to said external perimeter, whereby a closed flux loop within each said side shield encircles said perimeter of said non-magnetic inclusion and wherein a portion of said flux loop is parallel to said ABS and is wholly contained within the matrix of said side shield between said inclusion and said ABS.

6. The magnetic write head of claim 5 wherein said external perimeter of each of said side shields has a first edge that is perpendicular to said ABS that is approximately 0.5 microns in length.

7. The magnetic write head of claim 6 wherein said internal close perimeter of said inclusion has a first edge that is parallel to said first edge of said external perimeter and has a length of approximately 0.25 microns.

8. The magnetic write head of claim 6 wherein said internal perimeter of said non-magnetic inclusion has an edge that is parallel to said ABS and is displaced by approximately 0.15 microns from a parallel edge of said external perimeter.

9. The magnetic write head of claim 1 further including leading and trailing shields that are formed of porous heterogenous material containing non-magnetic inclusions.

* * * * *